United States Patent
Bjorkengren

(10) Patent No.: US 9,432,465 B1
(45) Date of Patent: Aug. 30, 2016

(54) SERVICE DISCOVERY WITH BEACONS HAVING RANKED NEIGHBORING SERVICES

(71) Applicant: Intel Corporation, Santa Clara, CA (US)

(72) Inventor: Ulf Bjorkengren, Bjarred (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,307

(22) Filed: Sep. 25, 2015

(51) Int. Cl.
| | |
|---|---|
| H04B 7/00 | (2006.01) |
| H04L 29/08 | (2006.01) |
| H04W 48/16 | (2009.01) |
| H04W 40/24 | (2009.01) |
| G06F 3/0482 | (2013.01) |

(52) U.S. Cl.
CPC ............ *H04L 67/16* (2013.01); *G06F 3/0482* (2013.01); *H04L 67/02* (2013.01); *H04W 40/244* (2013.01); *H04W 48/16* (2013.01)

(58) Field of Classification Search
CPC ... H04W 4/02; H04W 4/025; H04W 64/006; H04W 88/02; H04W 12/06; H04W 8/005; G01S 2013/466; G01S 5/0009; G01S 5/0252; G01S 5/0294; G01S 5/0289; G01S 13/46; G01S 13/758; G01S 13/825; G01S 1/042; G01S 1/68
USPC ................... 455/500, 404.2, 456.1; 340/10.1
See application file for complete search history.

(56) References Cited

U.S. PATENT DOCUMENTS

| | | | |
|---|---|---|---|
| 7,509,131 | B2 | 3/2009 | Krumm et al. |
| 7,751,829 | B2 | 7/2010 | Masuoka et al. |
| 8,045,482 | B2 | 10/2011 | Davis et al. |
| 8,228,171 | B2 | 7/2012 | Bauchot et al. |
| 8,665,154 | B2 | 3/2014 | Lin et al. |

*Primary Examiner* — Shaima Q Aminzay
(74) *Attorney, Agent, or Firm* — Schwabe, Williamson & Wyatt, P.C.

(57) ABSTRACT

Embodiments of techniques, apparatuses, systems and computer-readable media for consuming services for a user equipment (UE) apparatus are disclosed. In some embodiments, a first signal at a second signal are received respectively from a first and a second beacon apparatus, the signals indicating a service associated with the respective beacon apparatuses, and a list of neighboring services proximately disposed to the respective beacon apparatuses, a list is generated and displayed at the UE apparatus in accordance with ranking criterion of the lists and the first and second signal strengths of the first and second signals received at the UE. Other embodiments may be disclosed and/or claimed.

24 Claims, 12 Drawing Sheets

Data for Correlation Table
List Position vs. Signal Strength Position

| Service | Service in Proximity | Ordered list Position | UE Signal Strength Position | Position Difference | Correlation Value |
|---|---|---|---|---|---|
| A | A | 1 | 3 | 2 | 7 |
| A | B | 3 | 3 | 0 | 9 |
| A | C | 2 | 3 | 1 | 8 |
| A | D | 4 | 3 | 1 | 8 |
| A | E | 6 | 3 | 3 | 6 |
| A | F | 5 | 3 | 2 | 7 |
| B | A | 4 | 5 | 1 | 8 |
| B | B | 1 | 5 | 4 | 5 |
| B | C | 3 | 5 | 2 | 7 |
| B | D | 2 | 5 | 3 | 6 |
| B | E | 6 | 5 | 1 | 8 |
| B | F | 5 | 5 | 0 | 9 |
| C | A | 2 | 2 | 0 | 9 |
| C | B | 3 | 2 | 1 | 8 |
| C | C | 1 | 2 | 1 | 8 |
| C | D | 4 | 2 | 2 | 7 |
| C | E | 6 | 2 | 4 | 5 |
| C | F | 5 | 2 | 3 | 6 |
| D | A | 5 | 4 | 1 | 8 |
| D | B | 2 | 4 | 2 | 7 |
| D | C | 4 | 4 | 0 | 9 |
| D | D | 1 | 4 | 3 | 6 |
| D | E | 3 | 4 | 1 | 8 |
| D | F | 6 | 4 | 2 | 7 |
| E | A | 6 | 6 | 0 | 9 |
| E | B | 4 | 6 | 2 | 7 |
| E | C | 5 | 6 | 1 | 8 |
| E | D | 3 | 6 | 3 | 6 |
| E | E | 1 | 6 | 5 | 4 |
| E | F | 2 | 6 | 4 | 5 |
| F | A | 6 | 1 | 5 | 4 |
| F | B | 5 | 1 | 4 | 5 |
| F | C | 4 | 1 | 3 | 6 |
| F | D | 3 | 1 | 2 | 7 |
| F | E | 2 | 1 | 1 | 8 |
| F | F | 1 | 1 | 0 | 9 |

FIG. 3D

Beacon Apparatus

US 9,432,465 B1

SERVICE DISCOVERY WITH BEACONS HAVING RANKED NEIGHBORING SERVICES

TECHNICAL FIELD

The present disclosure relates generally to the technical field of communication, and more particularly, to providing assistance to the discovery of services via identification of services proximal to a user equipment (UE) apparatus.

BACKGROUND

Advances in integrated circuit, computing, networking and related technologies have led to wide spread implementation of consumption of services over networks. For example, Google® has disclosed efforts on a project called Physical Web, based on services that are identified by broadcasts to UE apparatuses, such as smart phones, through wireless communications from beacon apparatuses. These beacon apparatuses broadcast beacon signals that contain information about the services of various service providers associated with the beacon apparatuses. Currently, these broadcast messages are limited in size, therefore limited in the information they provide. Often, the metadata information about the service merely includes a uniform resource locator (URL) that points to a webpage where more data on the service may be available.

In scenarios where several beacon apparatuses are located in the same proximity, a UE apparatus may receive messages from multiple such beacon apparatuses. The user of the UE apparatus may wish to see a list ranked based on proximity of the respective services to the UE apparatus. In legacy implementations, this ranking is based on the beacon signal strength as received by the UE apparatus, where a stronger signal strength may indicate a closer service. However, in some situations the location of natural or man-made features in an area may interfere with the beacon apparatus signal strength and may cause it to not be a reliable indicator of the proximity of the service. For example, a structure between a beacon apparatus sending a signal about a service to a UE apparatus may attenuate the signal resulting in a signal strength indicating that the service is further away in relation to other services than it actually is. In another example, one or more structures may provide a waveguide situation that lowers the attenuation of a signal, resulting in a signal strength indicating that the service is closer in relation to other services than it actually is.

BRIEF DESCRIPTION OF THE DRAWINGS

These and other issues may be overcome by implementing embodiments of this disclosure. In embodiments, a beacon apparatus may send a signal about its associated service provider's service by transmitting a URL that may indicate a ranked list of the services, including the service provider's service and a number of neighboring services provided by neighboring service providers proximately located with the service provider associated with the beacon apparatus. The list may be ranked by the distances from the location of the service provider associated with the beacon apparatus sending the beacon signal to the respective locations of each of the other neighboring service providers that are proximal to the service provider associated with the beacon apparatus. In embodiments, multiple beacon signals may be received by a UE apparatus from multiple beacon apparatuses. The signal strength of each received beacon signal from the multiple beacon apparatuses may be additionally employed to generate a composite ranked list of the various services, for a user of the UE apparatus to select for further discovery of the selected service.

Embodiments will be readily understood by the following detailed description in conjunction with the accompanying drawings. To facilitate this description, like reference numerals may designate like structural elements. Embodiments are illustrated by way of example, and not by way of limitation, in the figures of the accompanying drawings.

FIG. 3D illustrates an example of data that may be used to determine the elements of a correlation matrix to determine a list of services near a UE apparatus, in accordance with various embodiments.

DETAILED DESCRIPTION

Figure 1A:
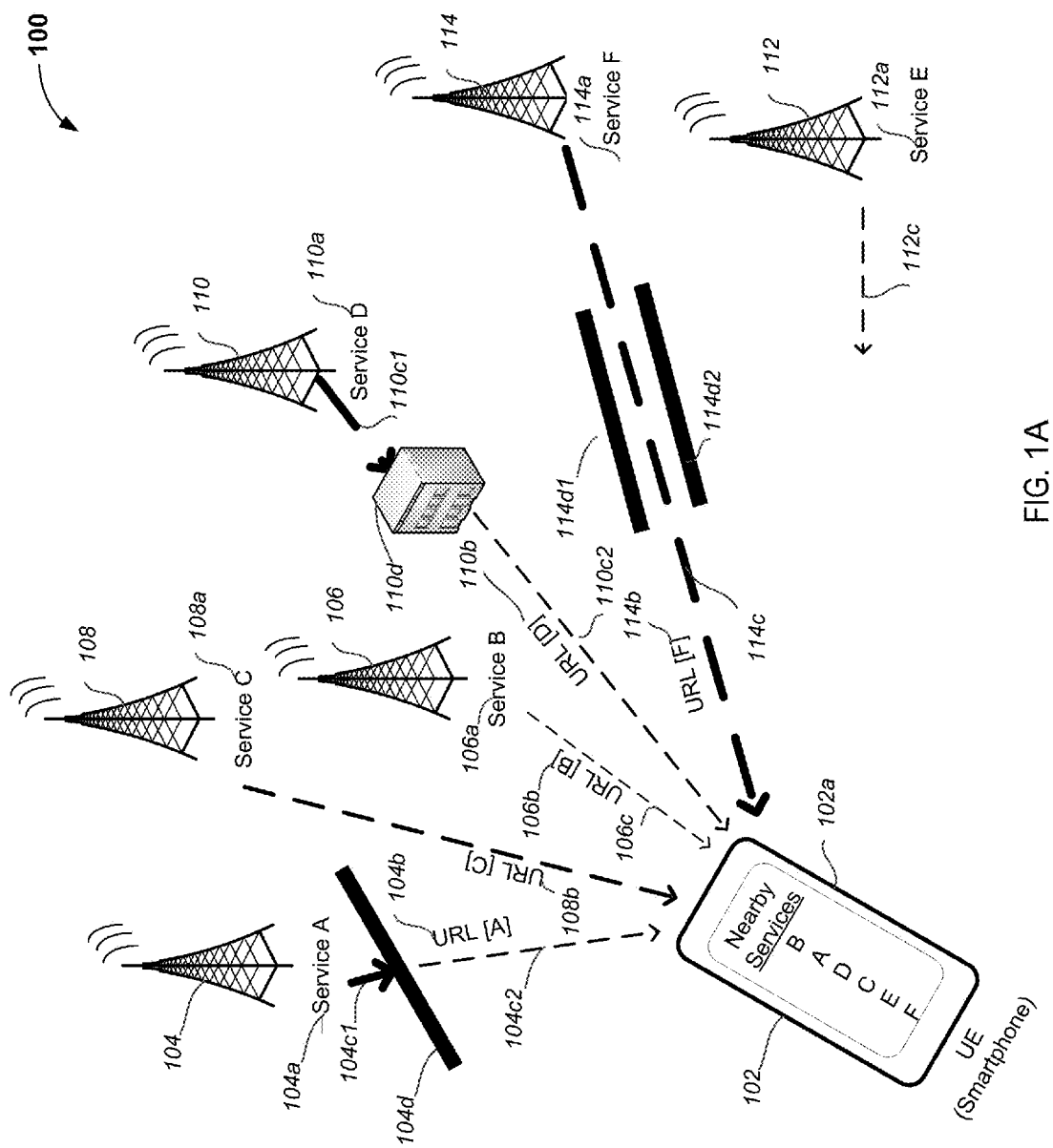
FIG. 1A depicts a diagram of one example of a plurality of services of a plurality of service providers associated respectively with a plurality of beacon apparatuses sending beacon signals indicating respective lists of services, including nearby services, in accordance with various embodiments.

Embodiments of techniques, apparatuses, systems and computer-readable media for determining the proximity of services from a UE apparatus are disclosed. In some embodiments, a first beacon signal and a second beacon signal may be received respectively from a first and a second beacon apparatus, the beacon signals respectively indicating a service of a service provider associated with the respective beacon apparatuses, and a list of neighboring services proximately located to the respective service providers associated with the beacon apparatuses. A list may be generated and displayed at the UE apparatus for the user to further discover the services, in accordance with ranking criterion of the lists and first and second signal strengths of the first and second beacon signals received at the UE.

In the following detailed description, reference is made to the accompanying drawings which form a part hereof wherein like numerals may designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 depicts a diagram of one example of a plurality of services of a plurality of service provider associated respectively with a plurality of beacon apparatuses that are sending signals indicating respective lists of services, including nearby services, in accordance with various embodiments. Diagram 100 shows a UE apparatus 102, such as a smartphone, that is receiving, from a plurality of beacon apparatuses 104, 106, 108, 110, 112 a plurality of signals 104c, 106c, 108c, 110c, 112c. In addition, beacon apparatus E 114 has beacon signal E 112c that is not received by the UE 102.

In embodiments, beacon apparatus A 104 may be associated with a service provider A that provides service A 104a. Service A 104a may be one of any number of services where the service provider of service A may want to transmit information about service A. In non-limiting examples, this may include the availability of service A, information about service provider A, a description of service A, a description of products associated with service A, and/or how to access service A. In embodiments, service provider A of service A 104a may be connected to a beacon apparatus 104 that may regularly transmit signals 104c that provide information about service A. In embodiments, for service A 104a, the beacon signal 104c from beacon apparatus A 104 may include a uniform resource locator (URL) associated with service A (URL[A]) 104b. In examples, URL[A] 104b may be transmitted as part of the metadata associated with the beacon signal 104c for service A 104a, or may be broadcast in another portion of the beacon signal (hereinafter, may be simply referred to as "signal").

In embodiments, the signal 104c from beacon apparatus 104 for service A 104a, may use Bluetooth®, Bluetooth low energy, Wi-Fi, cellular, and/or any other suitable communications technology. In embodiments, the beacon apparatus 104 may be a component within an identification device (not shown) associated with an Internet of things (IoT) implementation, where a service may be associated with a physical item to which the identification device is attached.

In embodiments, the signal 104c for beacon apparatus 104 may encounter an obstruction, such as a wall 104c that may cause the initial strength of the signal 104c1 to attenuate to a lesser strength 104c2 before reaching the UE 102. In non-limiting examples, the height, width, thickness, materials used, orientation, and other attributes of the wall 104d may affect the degree to which the signal strength 104c2 is attenuated.

Figure 1B:
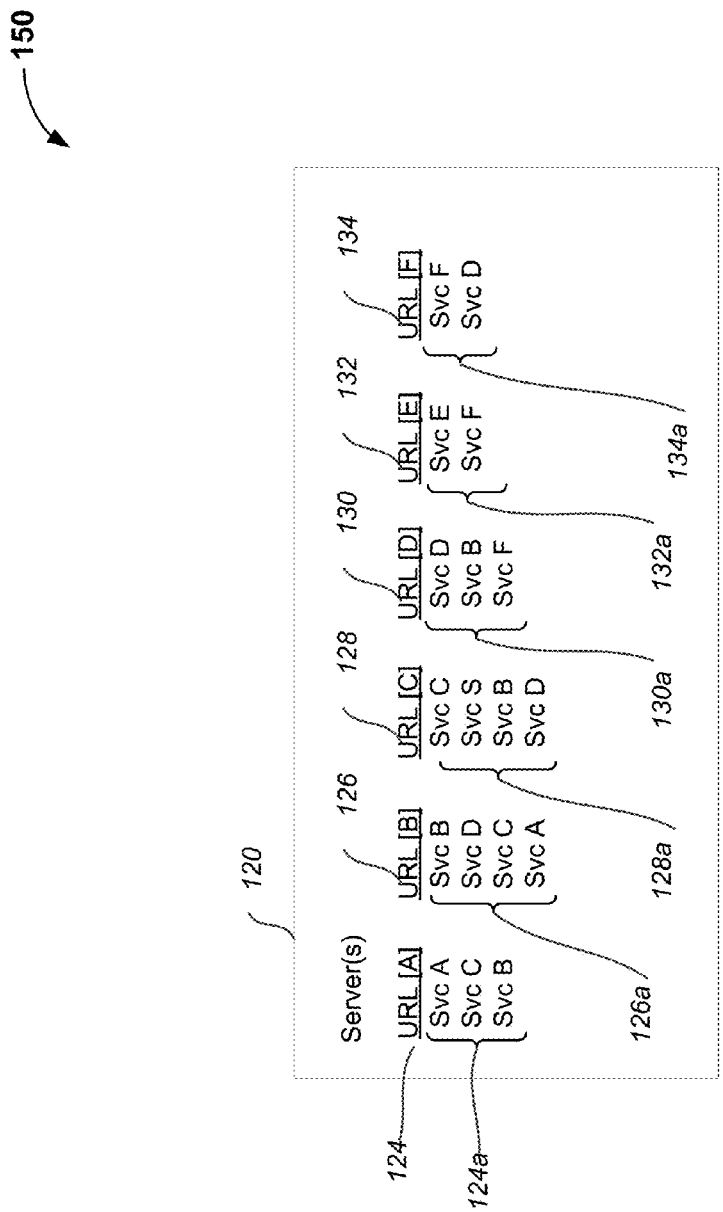
FIG. 1B depicts a chart that illustrates, for each service, a list of services proximal to the service ordered by the distance to each service, that may be similar to the example of services as depicted in FIG. 1A, in accordance with various embodiments.

The URL[A] 104b, included in the signal 104c1, 104c2, may be a URL that indicates a storage location on a server, which may be similar to storage location 124 on a server 120 in FIG. 1B. In embodiments, the server 120 may be implemented as one or more servers, as a cloud, as a file share, or in any other manner in which an accessible digital storage may be implemented and accessed. The storage location 124 may be implemented as a URL, a file share address, a resource address, or in any other manner as a storage location may be addressed on the server 120. In embodiments, URL[A] 104b may also indicate a list 124a of nearby services proximal to Service A 104, where the list 124a may be ordered according to a ranking criterion. In embodiments, the lists of services 124a, 126a, 128a, 130a, 132a, 124a may include services, which service providers do not have associated beacon apparatuses broadcasting their service, such as Service E 112a which service provider do have an associated beacon apparatus 112.

In embodiments, the list 124a of services may be ordered by a ranking criterion of ascending distances of the locations of the respective of nearby service providers proximal to the location of service provider A of service A 104a. In embodiments, service A 104a provided by service provider A associated with the beacon apparatus A 104, may be at the top of the list. In embodiments, other ranking criterion may be used to order the list of services 124a, such as the type of each service provided. Examples of service provided may include, but are not limited to, clothing, electronics, appliances, automobiles, insurance sales, dry-cleaning, inventory items, pets, etc. In other embodiments, ranking criterion may also include service provider, delivery method of the service, companies associated with the service, and the like. The list of nearby services included may be limited to for example nearby service providers within a radius of the service provider associated with the beacon apparatus, same shopping mall or same section/floor of the shopping mall, streets within a neighborhood (such as "downtown," or other geographical criteria).

Beacon apparatus B 106, in embodiments, may be associated with a service provider B providing a service B 106a. Service B 106a may be a service similar to, related to, or different from the service A 104a. Beacon apparatus B 106 may send a signal 106c that may contain a URL associated with service B (URL[B]) 106*b*. URL[B] 106*b* may indicate a location 126 on a server 120 in FIG. 1B that indicates a list of other nearby services 126*a* proximal to service provider B of service B 106*a*.

Beacon apparatus C 108, in embodiments, may be associated with a service provider C providing a service C 108*a*. Service C 108*a* may be a service similar to, related to, or different from other services 104*a*, 106*a*, 110*a*, 112*a*, 114*a*, 116*a* and may have the same or a different service provider as the other services. Beacon apparatus C 108 may send a signal 108*c* that may contain a URL associated with service C (URL[C]) 108*b*. URL[C] 108*b* may indicate a location 128 on a server 120 in FIG. 1B that indicates a list of other nearby services 128*a* proximal to service C 108*a*.

Beacon apparatus D 110, in embodiments, may be associated with a service provider D providing a service D 110*a*. Service D 110*a* may be a service similar to, related to, or different from other services 104*a*, 106*a*, 108*a*, 112*a*, 114*a*, 116*a* and may have the same or a different service provider as the other services. Beacon apparatus D 110 may send a signal 110*c*1 that may contain a URL associated with service D (URL[D]) 110*b*. URL[D] 110*b* may indicate a location 130 on a server 120 in FIG. 1B that may indicate a list of other nearby services 130*a* proximal to service provider D of service D 110*a*. Building 110*d* may be present between the beacon apparatus 110 and the UE 102 that may cause the transmitted signal 110*c*1 to be attenuated to an attenuated signal 110*c*2 that is received by the UE 102. This attenuation may be caused by the dimensions of the building, materials used in construction of the building, the orientation of the building, and the like.

Beacon apparatus E 112, in embodiments, may be associated with a service provider E providing a service E 112*a*. Service E 112*a* may be a service similar to, related to, or different from other services 104*a*, 106*a*, 108*a*, 110*a*, 114*a*, 116*a* and may have the same or a different service provider as the other services. Beacon apparatus E 112 may send a beacon signal 112*c* that may contain a URL associated with service E (URL[E]) 112*b*. URL[E] 112*b* may indicate a location 132 on a server 120 that indicates a list of other nearby services 132*a* proximal to service provider C of service C 108*a*. In the example depicted in diagram 100, the beacon signal 112*c* may not reach the UE 102.

Beacon apparatus F 114, in embodiments, may be associated with a service provider F providing a service F 114*a*. Service F 114*a* may be a service similar to, related to, or different from other services 104*a*, 106*a*, 108*a*, 110*a*, 112*a*, 116*a* and may have the same or a different service provider as the other services. Beacon apparatus F 114 may send a beacon signal 114*c*1 that may be less attenuated due to structures 114*d*1, 114*d*2 resulting in a waveguide that may produce a stronger signal 114*c*2 than would otherwise be received. The beacon signal may contain a URL associated with service F (URL[F]) 114*b*. URL[F] 114*b* may indicate a location 134 on a server 120 that indicates a list of other nearby services 134*a* proximal to service provider F of service F 114*a*.

In the example depicted in diagram 100, the UE 102 may receive multiple signals 104*c*2, 106*c*, 108*c*, 110*c*2, 114*b* from respective beacon apparatuses associated with the respective multiple signals. As can be seen in the example, service provider F of service F 114*a* may be furthest away from the UE 102 and service provider of service B 106*a* may be the closest to the UE 102. However, the strength of the signal from beacon apparatus 114 associated with service F 114*a* may be stronger than the signal from beacon apparatus 106 associated with service B 106*a*. In legacy systems that use only the power of the received signal to indicate the proximity of the services to the UE apparatus 102, in these legacy systems the UE apparatus may incorrectly conclude that service provider F of Service F 114*a* is closer than service provider B of service B 106*a*.

In embodiments, the signal strength at the UE 102 for each signal 104*c*2, 106*c*, 108*c*, 110*c*2, 114*b* may be used in conjunction with the respective ordered lists 124*a*, 126*a*, 128*a*, 130*a*, and 134*a* for each service A 124, B 126, C 128, D 130, and F 134 having a signal that reaches UE 102 to generate a composite ordered list of the services. In embodiments, the respective ordered lists may be ranked by the proximity of the respective service provider associated with the beacon apparatus to the other service providers. Therefore, using signal strengths of the respective signals and the respective ordered lists from the respective broadcast apparatuses 104, 106, 108, 110, 112, 114 together may provide a more accurate composite list 102*a* of services proximal to the UE 102.

FIG. 1B shows a data store that illustrates, for each service, a list of nearby services that are proximal to the service of a service provider associated with a beacon apparatus, where the list of services may be ordered by the distance to each service, as may be shown in FIG. 1A, in accordance with various embodiments. Data store 120 may contain a plurality of lists of services 124*b*, 126*b*, 128*b*, 130*b*, 132*b*, 134*b* proximal to the respective services of the service providers associated with the beacon apparatuses. Each list may be identified by a URL 124, 126, 128, 130, 132, 134 that may correspond to each service of a service provider associated with a respective beacon apparatus. These URLs may be similar to the transmitted URLs 104*b*, 106*b*, 108*b*, 110*b*, 112*b*, 114*b* of FIG. 1A.

In embodiments, the order of the lists of services 124*b*, 126*b*, 128*b*, 130*b*, 132*b*, 134*b* may be based on any relevant criterion. In embodiments, the lists of services 124*b*, 126*b*, 128*b*, 130*b*, 132*b*, 134*b* may be ordered by the distances between the locations of the respective service providers of services in the list, for example list 124*b*, and the location of the service provider associated with the beacon apparatus, for example beacon A 124. In non-limiting examples, a partial or a complete list of nearby services may be included in a list of services.

The data store 120 may be a single data store on a single computing device, or data store 120 may be spread across multiple computers or multiple databases across a local or a wide area network.

Figure 2:
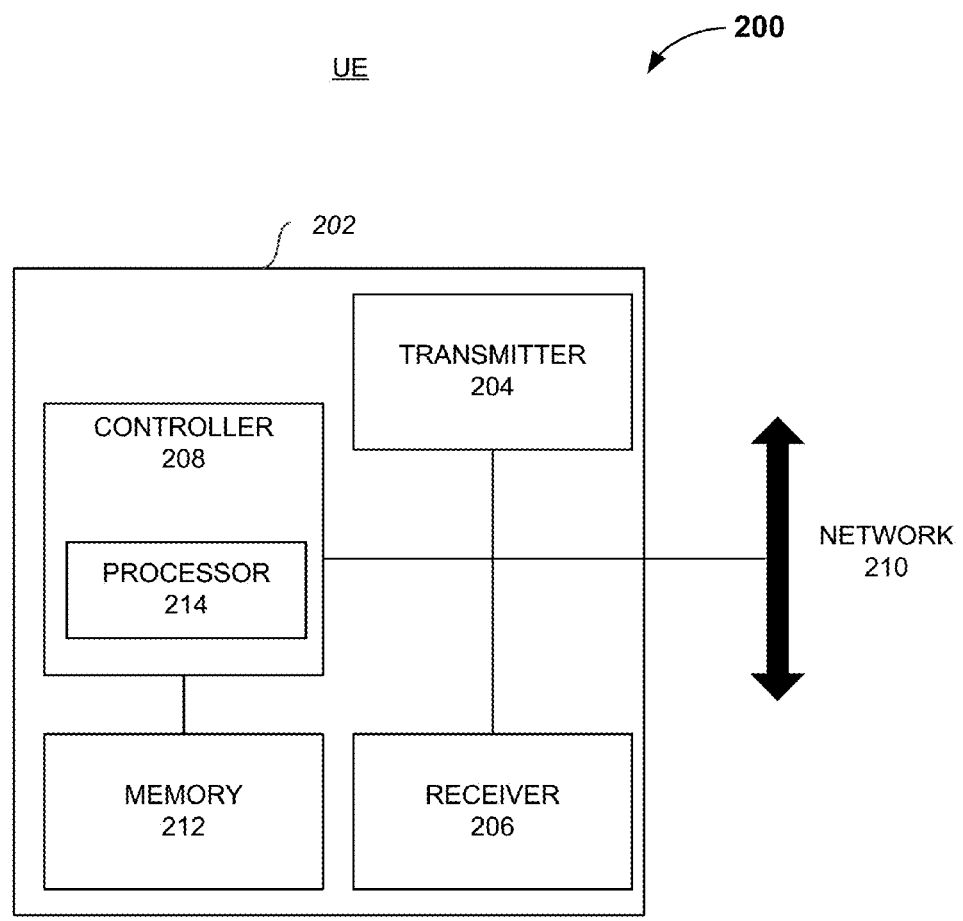
FIG. 2 illustrates electronic device circuitry that may be UE apparatus circuitry, a part of UE apparatus circuitry, or some other type of circuitry, in accordance with various embodiments.

FIG. 2 illustrates using diagram 200 a UE apparatus 202, which may be similar to the UE apparatus 102 in FIG. 1. The UE apparatus 202 may be UE circuitry, or some other type of circuitry in accordance with various embodiments. In embodiments, the UE apparatus circuitry 202 may be incorporated into or otherwise be a part of a UE device such as a smartphone, or some other type of electronic device. In embodiments, the UE apparatus circuitry 202 may include radio transmit circuitry 204 and receive circuitry 206 coupled to control circuitry 208. In embodiments, the transmit 204 and/or receive circuitry 206 may be elements or modules of transceiver circuitry (not shown). The UE apparatus circuitry 202 may be coupled with one or more plurality of antenna elements of one or more antennas (not shown) to connect with network 210. The UE apparatus circuitry and/or the components of the electronic device circuitry may be configured to perform operations similar to those described elsewhere in this disclosure.

The control circuitry 208 may be to identify received information as an indication, such as a URL, which may be similar to the URL of 124 in FIG. 1, that indicates a location of a list of URLs identified with a service of a service provider that is associated with a beacon apparatus, which may be similar to the beacon apparatus of 104 in FIG. 1. The control circuitry 208 may further include a processor 214 to execute, for example, instructions that are stored upon the memory/storage 212. The control circuitry 208 may be further to operate to acquire one or more lists from respectively received URLs from one or more beacon apparatuses. The transmit 204 and/or receive circuitry 208 may be to send and/or receive one or more signals or transmissions in accordance with requesting information related to the received URLs.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the UE apparatus circuitry 202 may be implemented in, or functions associated with the circuitry may be implemented by, one or more software or firmware modules.

Memory/storage 212 may be used to load and store data and/or instructions, for example, for consuming services with beacons having ranked neighboring services. Memory/storage 212, in one embodiment, may include any combination of suitable volatile memory (e.g., dynamic random access memory (DRAM)) and/or non-volatile memory (e.g., Flash memory).

Embodiments of the technology herein may be described as related to the 3GPP long term evolution (LTE) or LTE-advanced (LTE-A) standards. For example, terms or entities such as eNB, mobility management entity (MME), UE, etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Figure 3A:
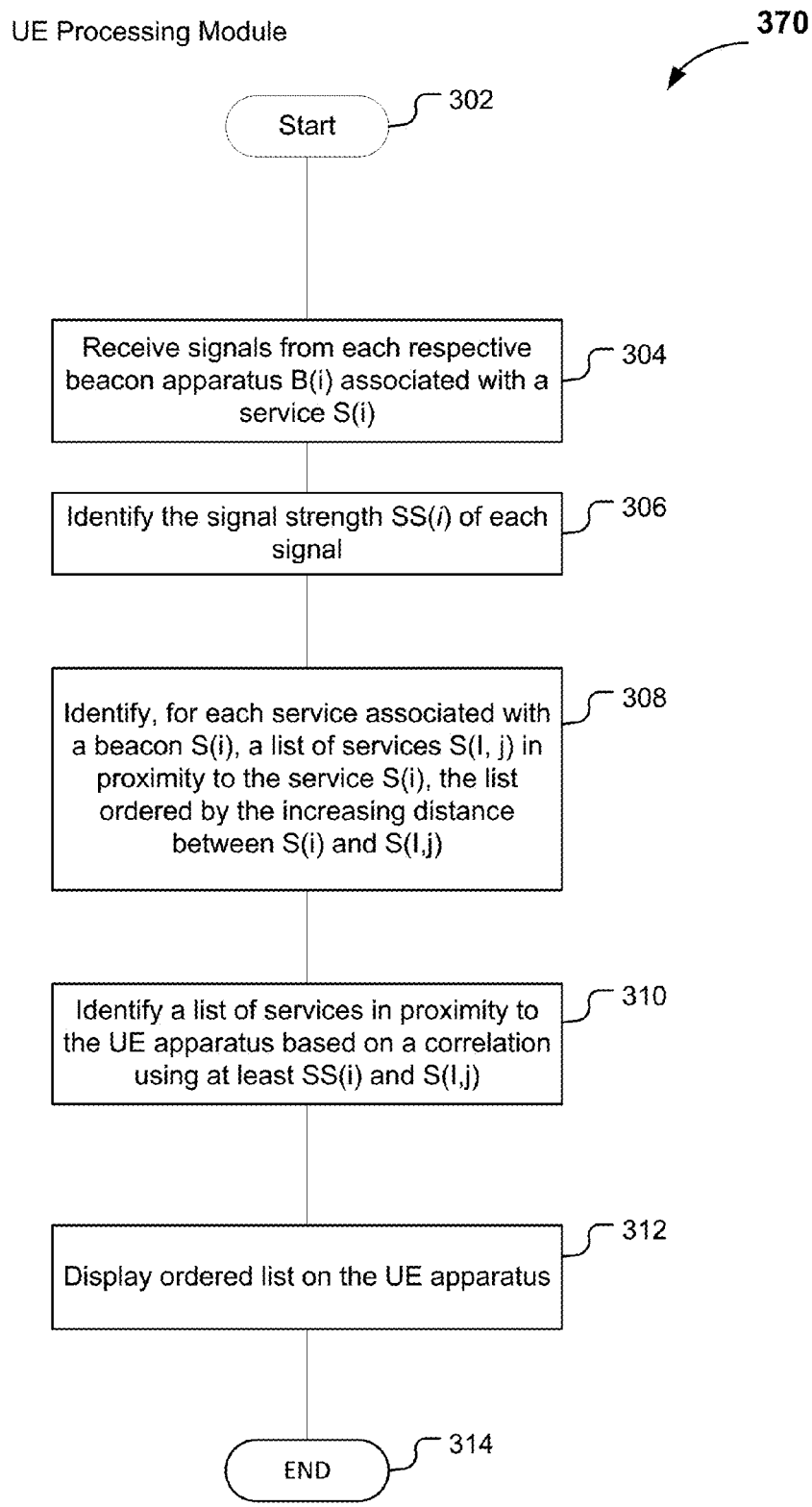
FIG. 3A is a flow diagram of an illustrative process for discovering services by a UE apparatus, in accordance with various embodiments.

FIG. 3A is a flow diagram of an illustrative process 370 for discovering services by a UE apparatus. It may be recognized that, while the operations of the process 370 are arranged in a particular order and illustrated once each, in various embodiments, one or more of the operations may be repeated, omitted or performed out of order. For illustrative purposes, operations of the process 370 may be described as performed by the UE apparatus 102 of FIG. 1A, but the operations of the process 370, including individual operations of the process 370, may be performed by any suitably configured computing device or collection of computing devices.

The process 370 may start at block 302.

At block 304, the process may receive signals from each respective beacon apparatus B(i) associated with a service provider providing service S(i). In embodiments, the respective beacon apparatuses B(i) may be similar to beacon apparatuses 104, 106, 108, 110, 112, 114 of FIG. 1A. In embodiments, a service provider of a service 104a, 106a, 108a, 110a, 112a, 114a may be associated with each beacon apparatus where a beacon apparatus may regularly transmit information about its associated service and neighboring services. In non-limiting examples, this information may include promotional information about the service, identification information about the service, a URL for the service that indicates the location on the network where more information about the service may be found, where the service may be provided, or a list of neighboring services. In embodiments, this information may be part of the regular data signal of the beacon apparatus, and/or may be part of the metadata that is sent along with the regular data signal of the beacon apparatus.

In embodiments, the URL that is transmitted from the beacon apparatus may indicate a location on the network where a list of other services that are proximal to the service related to the beacon apparatus may be found. In embodiments, the list of other services may be ordered by the distance of the location of each service to the location of the service associated with the beacon apparatus.

At block 306, the process may include measurement of the signal strength for each signal received from a beacon apparatus SS(i), where "i" may represent the specific beacon apparatus from which the signal originated. In embodiments, the location of the beacon apparatus, the transmission strength of the signal at the point of the beacon apparatus, the geometry and or location of the antenna (not shown) within the UE apparatus, and obstructions between the beacon apparatus and the UE apparatus may cause the signal strength received at the UE apparatus to be different from the case when the signal travels along an unobstructed path.

For example, a wall, which may be similar to the wall 104d of FIG. 1A may cause the signal 104c1 from beacon apparatus A 104 to become attenuated 104c2. In embodiments, this attenuation may be the result of the dimensions, materials, and/or thickness of the wall. In another example, two structures, which may be similar to the walls 114d1, 114d2 of FIG. 1A, may act as a waveguide and cause a signal 114c from a beacon apparatus 114 to be less attenuated than it otherwise would be as it approaches the UE apparatus 102.

At block 308, the process may identify, for each service provider of a service associated with a beacon apparatus (i), a list of services S(i,j), which may be similar to the list of services 124a, 126a, 128a, 130a, 132a, 134a in FIG. 1B, that are proximal to the service provider associated with the beacon apparatus (i). In embodiments, the list may be ordered by the distance between the locations of the services proximal to the service associated with the beacon apparatus and the location of the service associated with the beacon apparatus.

At block 310 the process may identify a list of services proximal to the UE apparatus based upon a correlation using at least SS(i) and S(i,j). In embodiments, the individual signal strengths of each beacon apparatus as measured at the UE apparatus may be used together with the ordered list of services proximal to each service provider associated with a beacon apparatus to create a list of services available to the UE apparatus for discovery, that may more accurately represent the distances of the services from the UE apparatus. In embodiments, a correlation between the two sets of data SS(i) and S(i,j), may be used to determine this list. More detailed aspects of correlation embodiments may be found in FIG. 3B.

At block 312, the process may display the ordered list on the UE apparatus. In embodiments, this may include displaying the ordered list on a smart phone device 102a for selection of a service from the list by the user of the UE apparatus for discovery.

At block 314, the process may end.

Figure 3B:
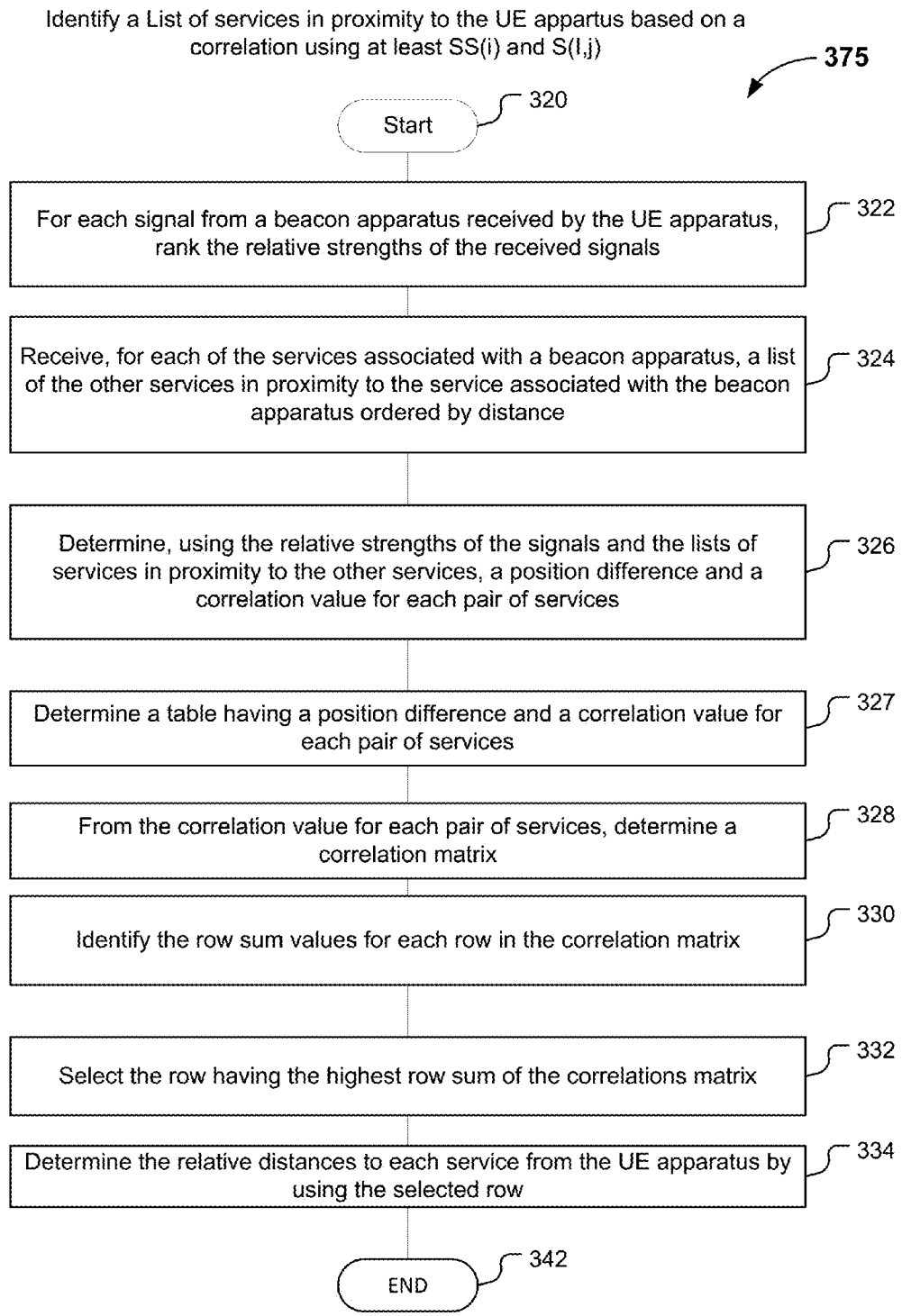
FIG. 3B is a flow diagram of an illustrative example for using a correlation matrix to determine a list of services near a UE apparatus, in accordance with various embodiments.

FIG. 3B is a flow diagram of an illustrative process 375 for using a correlation matrix to determine a list of services near a UE apparatus. It may be recognized that, while the operations of the process 375 are arranged in a particular order and illustrated once each, in various embodiments, one or more of the operations may be repeated, omitted or performed out of order. For illustrative purposes, operations of the process 375 may be described as performed by the UE apparatus 102 of FIG. 1A, but the operations of the process 375, including individual operations of the process 370, may be performed by any suitably configured computing device or collection of computing devices.

At block 320, the process may start.

At block 322, the process may, for each signal from a beacon apparatus received by the UE apparatus, rank the relative strengths of the received signals. In embodiments, the UE apparatus receive circuitry, which may be similar to the receive circuitry 206 of FIG. 2, may determine the strengths of the signals received from each beacon apparatus. In embodiments, the signal strengths may be a numerical value, or may be a relative comparison between the signal strengths of each of the signals received from each beacon apparatus. One example of this may be shown in table 378 of FIG. 3C.

At block 324, the process may receive, for each of the service providers associated with the beacon apparatuses, a list of the other services proximal to service provider associated with the beacon apparatus, ordered by distance. In embodiments, a list may be received as a URL, or as some other address location, that indicates a location at which the list may be found. In embodiments, the list may be at a server device, which may be similar to server 120 on FIG. 1B, that may be located at the beacon apparatus, the UE apparatus 102, or at some other location. In embodiments, the list will be ordered by the distance of each nearby service provider from the location of the service provider associated with the beacon apparatus.

At block 326, the process may determine, using the relative strengths of the signals and the lists of nearby services proximal to the associated services. In embodiments, an example of this may be shown in table 378 of FIG. 3C, where each service of a service provider related to a beacon apparatus 378a is ranked according to its relative signal strength 378b. Similarly, in embodiments, an example of the ordered list of services by distances that are proximal to each service related to a beacon apparatus may be as shown in table 379 of FIG. 3C. In this example, each service related to a beacon apparatus 379a is shown with the services proximal by distance to it 379b. For example, for service A, the services of service providers proximal to the service provider of service A by distance are A, C, B, D, F, E 379b1.

Figure 3C:
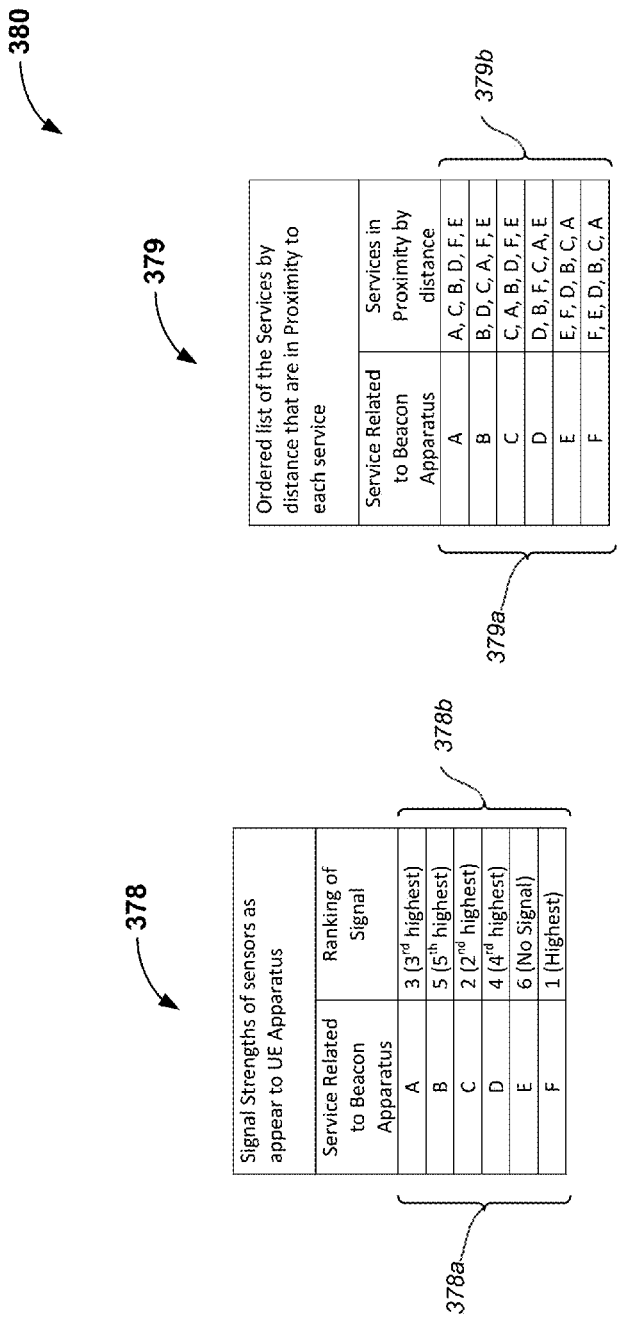
FIG. 3C illustrates two examples of data that may be used to determine a list of services near a UE apparatus, in accordance with various embodiments.

In embodiments, a position difference may be the difference in the place a service is listed in the signal strength ranking order, as may be shown in table 378 of FIG. 3C, compared to the place the service has in an ordered list of services by distance that are proximal to another service, as may be shown in table 379 of FIG. 3C. In embodiments, an example of this table is shown as table 385 of FIG. 3D.

In embodiments, a correlation value associated with a pair of services, which is shown as column 385f of table 385 of FIG. 3D, may be determined as a translation of the position difference value which is shown on column 385e, or a range of position difference values, to a correlation value. For example, correlation values may be assigned from 0 to 9 where 9 is a high correlation number indicating no difference in position numbers, 8 is a correlation number indicating 1 position difference, 7 is a correlation number indicating two position differences, etc.

At block 328, the process may determine a correlation matrix from the correlation value associated for each pair of services. In embodiments, an example of a correlation matrix may be found at table 390 of FIG. 3E, which may be created using the data found in table 385 of FIG. 3D.

At block 330, the process may identify the row sum for each row in the correlation matrix. An example of this may be found in 390a of FIG. 3E. In other embodiments, the row sum for each row may be calculated using a formula other than addition. The row sums may then be compared, with the row sums having the highest values indicating the most likely rankings of distances of services from the UE apparatus.

At block 332, the process may select the row having the highest row sum of the correlation matrix. In embodiments, an example of the value of row sums may be shown in 390a of FIG. 3E. In embodiments, if two row sums have the same value, other methods may be used to determine which row sum should be selected. For example, in embodiments, the row sum of the row having the highest Eigen value may be selected, or the first row sum having the highest value may be selected.

At block 334, the process may determine the relative distance to each service from the UE apparatus by using the selected row. For example, a selected row, such as the row 392 in FIG. 3E, may indicate that service A has a rank of 7, service B a rank of 9, a service C a rank of 8, a service D a rank of 8, a service E a rank of 6, and a service F a rank of 7. In this example, the services ordered by the distance from the UE apparatus, which is shown in column 395b of table 395 in FIG. 3F, B, C, D, A, F, E, is much closer to the ordering of the actual distances 395c from the UE apparatus, then the ordering of distances of the services based on signal strength alone 395a at the UE apparatus.

FIG. 3C illustrates two examples of data that may be used to determine a list of services near a UE apparatus, in accordance with various embodiments. These data may include a table of signal strengths of services as they appear to a UE apparatus 378, and the table of the ordered list of services by distance that are proximal to each service 389. In embodiments, these data may be used as described in operations 326 and operations 327 of process 375 as shown in FIG. 3B.

FIG. 3D illustrates an example of data that may be used to determine the elements of a correlation matrix to determine a list of services near a UE apparatus, in accordance with various embodiments. Embodiments of this data may be as described in operations 326 and 328 of process 375 as shown in FIG. 3B. In embodiments, this data may take the form of a table having columns of a service 385a, a service proximal 385b to the service 385a, an ordered list position 385c of the service proximal with respect to its position in the list of services for the service 385a, the UE signal strength position 385d of the service with respect to the signal strength of the service at the UE apparatus, the position difference 385e between the ordered list position 385c of the service and its position in the list of services 385a. The correlation value 385f may be determined from the position difference 385e, as may be described in operations 330 of process 375 of FIG. 3B.

Figures 3E, 3F:
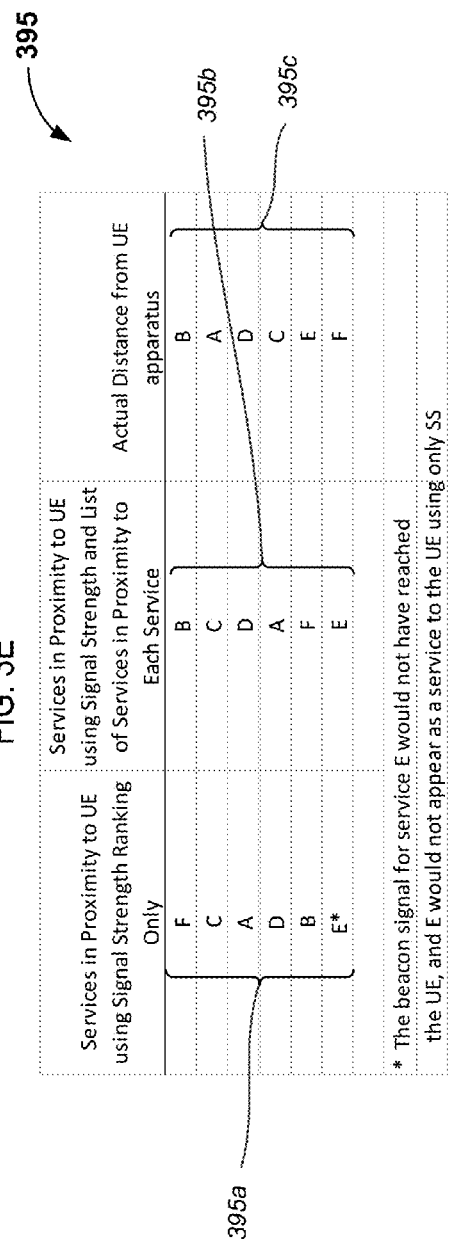
FIG. 3E illustrates an example of a correlation matrix that may be used to determine a list of services near a UE apparatus, in accordance with various embodiments.
FIG. 3F illustrates an example of various proximity rankings of services near a UE apparatus, in accordance with various embodiments.

FIG. 3E illustrates an example of a correlation matrix 390 that may be used to determine a list of services near a UE apparatus, in accordance with various embodiments. Embodiments of the correlation matrix may be similar to the correlation matrix as described in operations 330 and 332 of FIG. 3B.

FIG. 3F illustrates an example of various proximity rankings 395 of services near a UE apparatus, in accordance with various embodiments. Embodiments of the correlation matrix may be similar to the correlation matrix as described in operations 334 of FIG. 3B.

Figure 4:
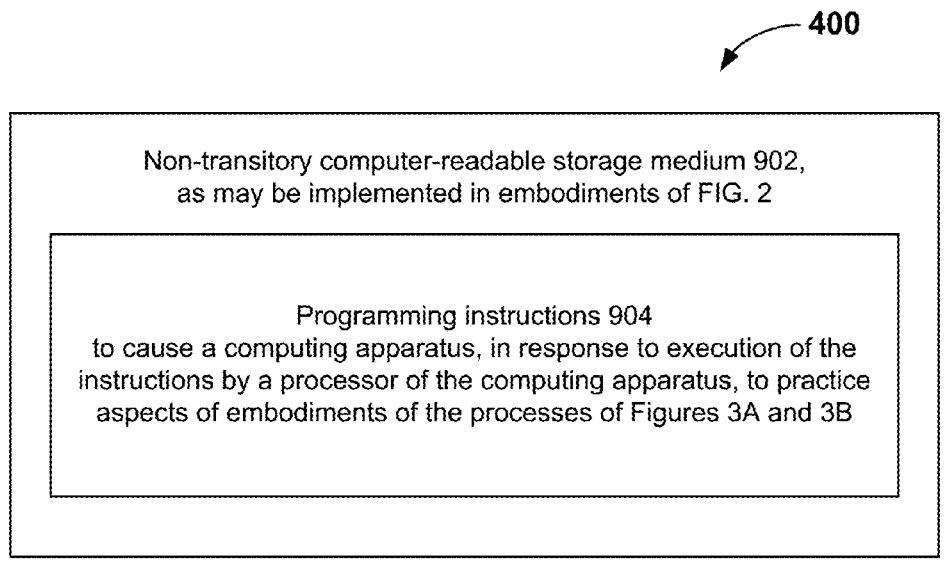
FIG. 4 is a diagram illustrating a non-transitory computer-readable storage medium for a UE apparatus, in accordance with various embodiments.

FIG. 4 is a diagram illustrating non-transitory computer readable media 402 for methods, systems and devices for performing the above-described techniques for embodiments disclosed herein. In some embodiments, such computer readable media 402 may be included in a storage device of any of the computing devices in the UE apparatus 102 for beacon apparatus 104, 106, 108, 110, 112, 114, as illustrated in FIG. 1A. For example, computational logic included in a storage device, such as memory 212 of FIG. 2 of any computing device may include assembler instructions 404 supported by a processing device included in the computing device, or may include instructions 404 in a high-level language, such as C, that can be compiled by the processing device. In some embodiments, a permanent copy of the computer readable instructions 404 may be placed into permanent storage in the storage device in the factory or in the field (through, for example, a machine-accessible distribution medium (not shown), such as a compact disc). In some embodiments, a permanent copy of the computer readable instructions 404 may be placed into permanent storage in the storage device through a suitable communication pathway (e.g., from a distribution server).

Figure 5:
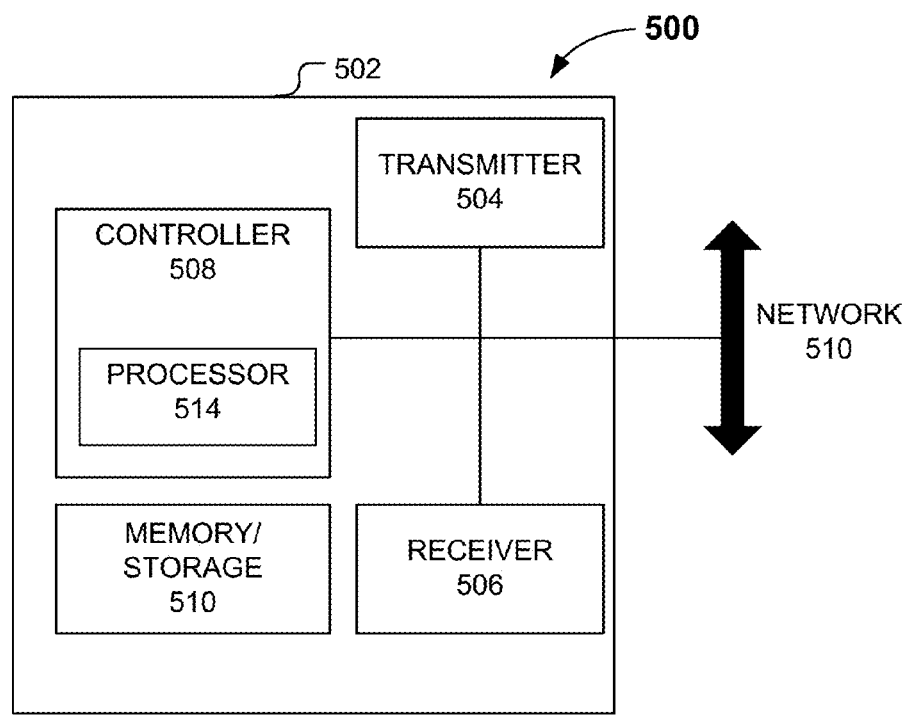
FIG. 5 illustrates electronic device circuitry that may be a beacon apparatus circuitry, a part of a beacon apparatus circuitry, or some other type of circuitry, in accordance with various embodiments.

FIG. 5 illustrates electronic device circuitry that may be a beacon apparatus circuitry, a part of a beacon apparatus circuitry, or some other type of circuitry, in accordance with various embodiments. Diagram 500 may show a beacon apparatus 502, which may be similar to the beacon apparatuses 104, 106, 108, 110, 112, 114 in FIG. 1. The beacon apparatus 502 may be evolved NodeB (eNB) circuitry, or some other type of circuitry in accordance with various embodiments. In embodiments, the beacon apparatus circuitry 502 may be, or may be incorporated into or otherwise a part of, an eNB, or some other type of electronic device. In embodiments, the beacon apparatus circuitry 502 may include transmit circuitry 504 and receive circuitry 506 coupled to control circuitry 508. In embodiments, the transmit 504 and/or receive circuitry 506 may be elements or modules. The electronic device circuitry 502 may be coupled with one or more plurality of antenna elements of one or more antennas (not shown) to connect with network 504, which may be similar to network 204 as shown in FIG. 2. The electronic device circuitry and/or the components of the electronic device circuitry may be configured to perform operations similar to those described elsewhere in this disclosure.

The control circuitry 508 may be used to identify a list of services ordered by the distance of the location of each of the services to the location of the service of the service provider associated with the beacon apparatus implemented by the electronic circuitry 502, which may be similar to the beacon apparatus of 104, 106, 108, 110, 112, 114 in FIG. 1A. The control circuitry 508 may further include a processor 514 to execute, for example, instructions that are stored upon the memory/storage 512. The control circuitry 508 may be further to operate to acquire one or more lists from respectively received URLs from one or more beacon apparatuses. The transmit 504 and/or receive circuitry 508 may be to send and/or receive one or more signals or transmissions which may include an indication, description, and/or URL related to the service associated with the beacon apparatus 502. In embodiments, the URL related to the service may refer to a list of services proximal to the service of a service provider related to the beacon apparatus 502 where the list of services is ordered by the distance of the respective services to the service provider associated with beacon apparatus 502. In one or more embodiments, the service may be accessible by communication through network 510.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry 502 may be implemented in, or functions associated with the circuitry may be implemented by, one or more software or firmware modules.

Memory/storage 512 may be used to load and store data and/or instructions, for example, for system. Memory/storage 512 for one embodiment may include any combination of suitable volatile memory (e.g., dynamic random access memory (DRAM)) and/or non-volatile memory (e.g., Flash memory).

Figure 6:
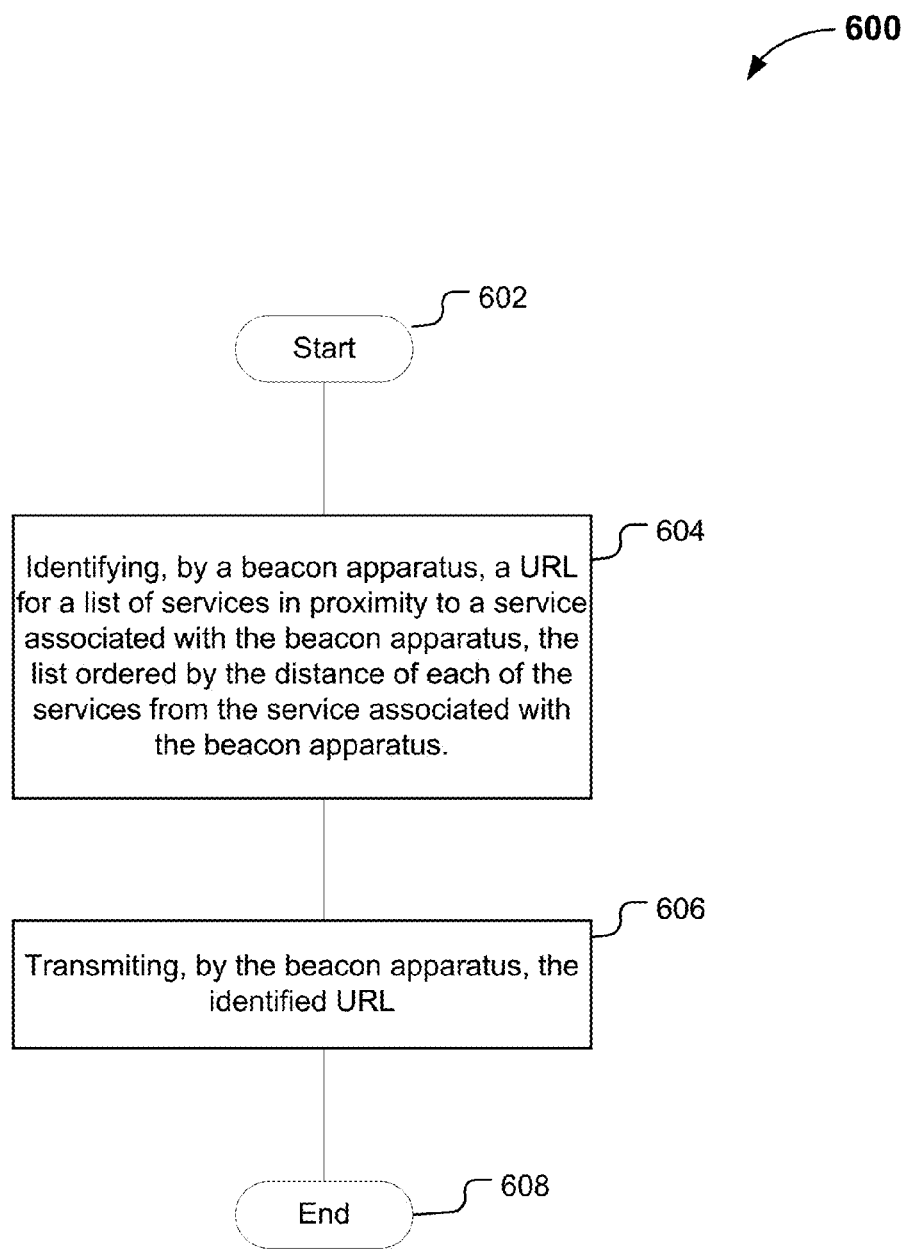
FIG. 6 is a flow diagram of an illustrative process for determining a list of services proximal to a beacon apparatus associated with the service and broadcasting the list of services, in accordance with various embodiments.

FIG. 6 is a flow diagram 600 of an illustrative process for determining a list of services proximal to a service provider associated with a beacon apparatus broadcasting the list of services, in accordance with various embodiments. It may be recognized that, while the operations of the process 600 are arranged in a particular order and illustrated once each, in various embodiments, one or more of the operations may be repeated, omitted or performed out of order. For illustrative purposes, operations of the process 600 may be described as performed by the beacon apparatus 502 of FIG. 5, but the operations of the process 600, including individual operations of the process 600, may be performed by any suitably configured computing device or collection of computing devices.

At block 602, the process may start.

At block 604, the process may identify a URL indicating a list of services proximal to a service of a service provider associated with the beacon apparatus, the list ordered by the distance of each of the services from the service provider associated with the beacon apparatus. In embodiments, the URL may indicate a storage location that is connected to the beacon apparatus, or a storage location that is outside the beacon apparatus. In embodiments, any network addressable and accessible file indication scheme, for example an intra-network address, may be used. The contents of the list of files may be created and/or maintained by a number of different methods, non-limiting examples including input by a user who knows the distances of the services from the location of the service associated with the beacon apparatus, or regularly receive in a programmatic way services information and locations that may be used to create the list of proximal services and to order it for the service of the service provider associated with the beacon apparatus.

At block 606, the process may transmit the identified URL. In embodiments, the transmission may occur on a regular basis, based upon an event at the beacon apparatus location, based on varying times during the day, or on any other relevant basis. In embodiments, the URL may be transmitted as part of the regular data signal of the beacon apparatus, or the URL may be transmitted as part of the metadata associated with the signal of the beacon apparatus. In embodiments, the transmission of the signal may be either wireless, for example using the Bluetooth®, Bluetooth low energy, Wi-Fi, or cellular network technologies, or may be through a wired connection using an Ethernet, serial or other communication network technology.

At block 608, the process may end.

Figure 7:
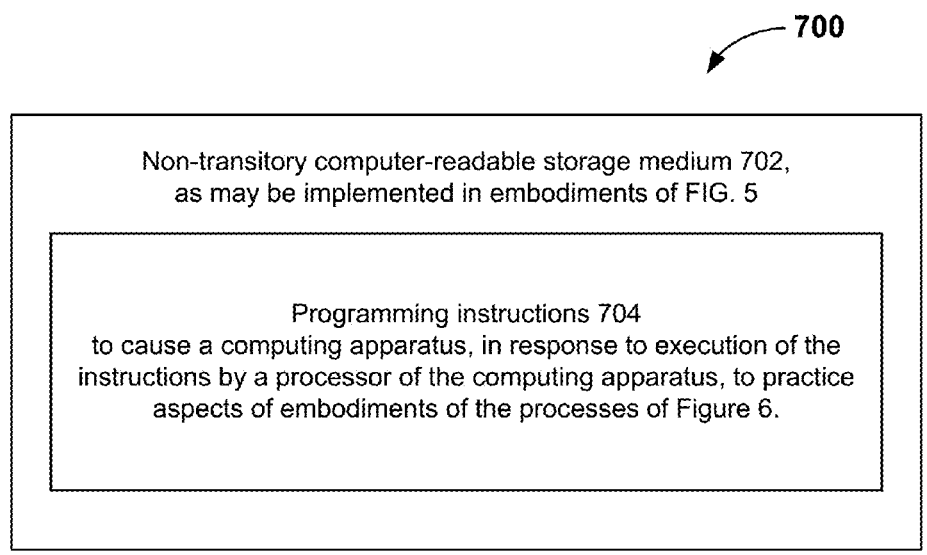
FIG. 7 is a diagram illustrating a non-transitory computer-readable storage medium for a beacon apparatus, in accordance with various embodiments.

FIG. 7 is a diagram illustrating a non-transitory computer-readable storage medium 702 for a beacon apparatus, and/or for methods, systems and devices for performing the above-described techniques. In some embodiments, such computer readable media 702 may be included in a storage device of any of the computing devices in the beacon apparatus 104, 106, 108, 110, 112, 114, as illustrated in FIGS. 2 and 5 (e.g., the memory/storage 510). For example, computational logic included in a storage device of any computing device may include assembler instructions 704 supported by a processing device included in the computing device, or may include instructions 704 in a high-level language, such as C, that can be compiled by the processing device. In some embodiments, a permanent copy of the computer readable instructions 704 may be placed into permanent storage 702 in the storage device in the factory or in the field (through, for example, a machine-accessible distribution medium (not shown), such as a compact disc). In some embodiments, a permanent copy of the computer readable instructions 704 may be placed into permanent storage in the storage device through a suitable communication pathway (e.g., from a distribution server).

The following paragraphs provide a number of examples of embodiments of the present disclosure.

Example 1 is a user equipment, UE, apparatus for discovering services, comprising: one or more processors; receive logic to be operated by the one or more processors to respectively receive a first beacon signal and a second beacon signal from a first beacon apparatus and a second beacon apparatus, wherein the first beacon signal includes a first service being advertised by the first beacon apparatus for a first service provider, and a first plurality of neighboring services provided by a first plurality of neighboring service providers proximately located from the first service provider, ordered in accordance with a first ranking criterion, and wherein the second beacon signal includes a second service being advertised by the second beacon apparatus for a second service provider and a second plurality of neighboring services provided by a second plurality of service providers proximately located from the second service provider, ordered in accordance with a second ranking criterion; and control logic to be operated by the one or more processors to generate and display a selectable list of services for discovery by a user of the UE apparatus, wherein the selectable list of services include the first and second services, and the first and second plurality of neighboring services ordered in accordance with the first and second ranking criterion, and respective first and second signal strengths of the first and second beacon signals.

Example 2 may include the subject matter of Example 1, wherein the first ranking criterion is based on distances between the respective locations of the first plurality of neighboring service providers and a location of the first service provider associated with the first beacon apparatus.

Example 3 may include the subject matter of Example 1, wherein the first and the second ranking criterion are the same.

Example 4 may include the subject matter of Example 1, wherein the receive logic is to further receive a third beacon signal from a third beacon apparatus, wherein the third beacon signal includes a third service being advertised by the third beacon apparatus for a third service provider and a third plurality of neighboring services provided by a third plurality of neighboring service providers proximately located from the third service provider; ordered in accordance with a third ranking criterion.

Example 5 may include the subject matter of Example 4, wherein the control logic is to further include with the selectable list of services the third services and the third plurality of neighboring services, further ordered in accordance with the third ranking criterion, and a third signal strength of the third beacon signal.

Example 6 may include the subject matter of Example 1, wherein the control logic is further to cause information about a selected one of the selectable list of services to be provided by the UE apparatus.

Example 7 may include the subject matter of Example 1, wherein the list of services for selection comprises a list of uniform resource locators, URLs.

Example 8 may include the subject matter of Example 7, wherein the plurality of services in the list of services for selection have a same URL with corresponding unique search strings appended to the URL.

Example 9 may include the subject matter of Example 1, wherein the first beacon signal comprises a single URL.

Example 10 may include the subject matter of Example 1, wherein the control logic is to further receive one or more additional ranking criteria for generating the selectable list of services, as input from a user of the UE apparatus, from storage on the UE apparatus, or from a device other than the UE apparatus.

Example 11 may include the subject matter of Example 1, wherein to receive a beacon signal, the receive logic is to receive the beacon signal using Bluetooth®, Bluetooth low-energy, Wi-Fi, or cellular technology.

Example 12 is a method for discovering services by a user equipment, UE, apparatus, the method comprising: respectively receiving, by the UE apparatus, a first beacon signal and a second beacon signal from a first beacon apparatus and a second beacon apparatus, the first beacon signal including a first service being advertised by the first beacon apparatus for a first service provider, and a first plurality of neighboring services provided by a first plurality of neighboring service providers proximately located from the first service provider, ordered in accordance with a first ranking criterion, and the second beacon signal including a second service being advertised by the second beacon apparatus for a second service provider and a second plurality of neighboring services provided by a second plurality of service providers proximately located from the second service provider, ordered in accordance with a second ranking criterion; generating and displaying, by the UE apparatus, a selectable list of services for discovering by a user of the UE apparatus, the selectable list of services including the first and second services, and the first and second plurality of neighboring services being ordered in accordance with the first and second ranking criterion, and respective first and second signal strengths of the first and second beacon signals.

Example 13 may include the subject matter of Example 12, wherein the first ranking criterion is based on distances between the respective locations of the first plurality of neighboring service providers and a location of the first service provider associated with the first beacon apparatus.

Example 14 may include the subject matter of Example 12, wherein the first and the second ranking criterion are the same.

Example 15 may include the subject matter of Example 12, further comprising receiving, by the UE apparatus, a third beacon signal from a third beacon apparatus, wherein the third beacon signal includes a third service being advertised by the third beacon apparatus for a third service provider, and a third plurality of neighboring services provided by a third plurality of neighboring service providers proximately located from the third service provider; ordered in accordance with a third ranking criterion.

Example 16 may include the subject matter of Example 15, further comprising including, by the UE apparatus, with the selectable list of services the third services and the third plurality of neighboring services, further ordered in accordance with the third ranking criterion, and a third signal strength of the third beacon signal.

Example 17 may include the subject matter of Example 12, wherein the list of services for selecting comprises a list of uniform resource locators, URLs.

Example 18 may include the subject matter of Example 17, wherein the plurality of services in the list of services for selecting have the same URL with corresponding unique search strings appended to the URL.

Example 19 may include the subject matter of Example 12, further comprising receiving one or more additional ranking criteria for generating the selectable list of services, as input from a user of the UE apparatus, from storage on the UE apparatus, or from a computer server other than the UE apparatus.

Example 20 may include the subject matter of Example 12, wherein the first beacon signal comprises a single URL.

Example 21 may include the subject matter of Example 12, wherein receiving a beacon signal is receiving the beacon signal using Bluetooth, Bluetooth low-energy, Wi-Fi, or cellular technology.

Example 22 is one or more computer-readable media comprising instructions that cause a computing device, in response to execution of the instructions by the computing device, to: respectively receive, by a user equipment, UE, apparatus, a first beacon signal and a second beacon signal from a first beacon apparatus and a second beacon apparatus, the first beacon signal to include a first service advertised by the first beacon apparatus for a first service provider, and a first plurality of neighboring services provided by a first plurality of neighboring service providers proximately located from the first service provider, ordered in accordance with a first ranking criterion, and the second beacon signal including a second service advertised by the second beacon apparatus for a second service provider and a second plurality of neighboring services provided by a second plurality of service providers proximately located from the second service provider, ordered in accordance with a second ranking criterion; generate and display, by the UE apparatus, a selectable list of services for discovering by a user of the UE apparatus, the selectable list of services including the first and second services, and the first and second plurality of neighboring services being ordered in accordance with the first and second ranking criterion, and respective first and second signal strengths of the first and second beacon signals.

Example 23 may include the subject matter of Example 22, wherein the first ranking criterion is based on distances between the respective locations of the first plurality of neighboring services providers and a location of the first service provider associated with the first beacon apparatus.

Example 24 may include the subject matter of Example 22, wherein the first and the second ranking criterion are the same.

Example 25 may include the subject matter of Example 22, further comprising receive, by the UE apparatus, a third beacon signal from a third beacon apparatus, wherein the third beacon signal includes a third service advertised by the third beacon apparatus for a third service provider, and a third plurality of neighboring services provided by a third plurality of neighboring service providers proximately located from the third service provider; ordered in accordance with a third ranking criterion.

Example 26 may include the subject matter of Example 25, is further to include, by the UE apparatus, with the selectable list of services the third service and the third plurality of neighboring services, further ordered in accordance with the third ranking criterion, and a third signal strength of the third beacon signal.

Example 27 may include the subject matter of Example 22, wherein the list of services for selecting comprises a list of uniform resource locators, URLs.

Example 28 may include the subject matter of Example 27, wherein the plurality of services in the list of services for selecting have the same URL with corresponding unique search strings appended to the URL.

Example 29 may include the subject matter of Example 22, further comprising to receive one or more additional ranking criteria to generate the selectable list of services as input from a user of the UE apparatus, from storage on the UE apparatus, or from a computer server other than the UE apparatus.

Example 30 may include the subject matter of Example 22, wherein the first beacon signal comprises a single URL.

Example 31 may include the subject matter of Example 22, wherein to receive a beacon signal is to receive the beacon signal using Bluetooth, Bluetooth low-energy, Wi-Fi, or cellular technology.

Example 32 is a computing device, comprising: means for respectively receiving a first beacon signal and a second beacon signal from a first beacon apparatus and a second beacon apparatus, the first beacon signal including a first service being advertised by the first beacon apparatus for a first service provider, and a first plurality of neighboring services provided by a first service plurality of neighboring service providers proximately located from the first service provider, ordered in accordance with a first ranking criterion, and the second beacon signal including a second service being advertised by the second beacon apparatus for a second service provider and a second plurality of neighboring services provided by a second plurality of service providers proximately located from the second service provider, ordered in accordance with a second ranking criterion; and means for generating and displaying a selectable list of services for discovering by a user of a user equipment, UE, apparatus, the selectable list of services including the first and second services, and the first and second plurality of neighboring services being ordered in accordance with the first and second ranking criterion, and respective first and second signal strengths of the first and second beacon signals.

Example 33 may include the subject matter of Example 32, wherein the first ranking criterion is based on distances between the respective locations of the first plurality of neighboring service providers and a location of the first service provider associated with the first beacon apparatus.

Example 34 may include the subject matter of Example 32, wherein the first and the second ranking criterion are the same.

Example 35 may include the subject matter of Example 32, further comprising means for receiving a third beacon signal from a third beacon apparatus, wherein the third beacon signal includes a third service being advertised by the third beacon apparatus for a third service provider, and a third plurality of neighboring services provided by a third plurality of neighboring service providers proximately located from the third service provider; ordered in accordance with a third ranking criterion.

Example 36 may include the subject matter of Example 35, further comprising means for including with the selectable list of services the third service and the third plurality of neighboring services, further ordered in accordance with the third ranking criterion, and a third signal strength of the third beacon signal.

Example 37 may include the subject matter of Example 32, wherein the list of services for selecting comprises a list of uniform resource locators, URLs.

Example 38 may include the subject matter of Example 37, wherein the plurality of services in the list of services for selecting have the same URL with corresponding unique search strings appended to the URL.

Example 39 may include the subject matter of Example 32, further comprising means for receiving one or more additional ranking criteria for generating the selectable list of services, as input from a user, from storage on the UE apparatus, or from a computer server other than the UE apparatus.

Example 40 may include the subject matter of Example 32, wherein the first beacon signal comprises a single URL.

Example 41 may include the subject matter of Example 32, wherein means for receiving a beacon signal is means for receiving the beacon signal using Bluetooth, Bluetooth low-energy, Wi-Fi, or cellular technology.

The invention claimed is:

1. A user equipment, UE, apparatus for discovering services, comprising:
    one or more processors;
    receive logic to be operated by the one or more processors to respectively receive a first beacon signal and a second beacon signal from a first beacon apparatus and a second beacon apparatus, wherein the first beacon signal includes a first service being advertised by the first beacon apparatus for a first service provider, and a first plurality of neighboring services provided by a first plurality of neighboring service providers proximately located from the first service provider, ordered in accordance with a first ranking criterion, and wherein the second beacon signal includes a second service being advertised by the second beacon apparatus for a second service provider and a second plurality of neighboring services provided by a second plurality of service providers proximately located from the second service provider, ordered in accordance with a second ranking criterion; and
    control logic to be operated by the one or more processors to generate and display a selectable list of services for discovery by a user of the UE apparatus, wherein the selectable list of services include the first and second services, and the first and second plurality of neighboring services ordered in accordance with the first and second ranking criterion, and respective first and second signal strengths of the first and second beacon signals.

2. The UE apparatus of claim 1, wherein the first ranking criterion is based on distances between the respective locations of the first plurality of neighboring service providers and a location of the first service provider associated with the first beacon apparatus.

3. The UE apparatus of claim 1, wherein the first and the second ranking criterion are the same.

4. The UE apparatus of claim 1, wherein the receive logic is to further receive a third beacon signal from a third beacon apparatus, wherein the third beacon signal includes a third service being advertised by the third beacon apparatus for a third service provider, and a third plurality of neighboring services provided by a third plurality of neighboring service providers proximately located from the third service provider; ordered in accordance with a third ranking criterion.

5. The UE apparatus of claim 4, wherein the control logic is to further include with the selectable list of services the third service and the third plurality of neighboring services, further ordered in accordance with the third ranking criterion, and a third signal strength of the third beacon signal.

6. The UE apparatus of claim 1, wherein the control logic is further to cause information about a selected one of the selectable list of services to be provided to the UE apparatus.

7. The UE apparatus of claim 1, wherein the list of services for selection comprises a list of uniform resource locators, URLs.

8. A method for discovering services by a user equipment, UE, apparatus, the method comprising:
    respectively receiving, by the UE apparatus, a first beacon signal and a second beacon signal from a first beacon apparatus and a second beacon apparatus, the first beacon signal including a first service being advertised by the first beacon apparatus for a first service provider, and a first plurality of neighboring services provided by a first plurality of neighboring service providers proximately located from the first service provider, ordered in accordance with a first ranking criterion, and the second beacon signal including a second service being advertised by the second beacon apparatus for a second service provider and a second plurality of neighboring services provided by a second plurality of service providers proximately located from the second service provider, ordered in accordance with a second ranking criterion;
    generating and displaying, by the UE apparatus, a selectable list of services for discovering by a user of the UE apparatus, the selectable list of services including the first and second services, and the first and second plurality of neighboring services being ordered in accordance with the first and second ranking criterion, and respective first and second signal strengths of the first and second beacon signals.

9. The method of claim 8, wherein the first ranking criterion is based on distances between the respective locations of the first plurality of neighboring services providers and a location of the first service provider associated with the first beacon apparatus.

10. The method of claim 8, wherein the first and the second ranking criterion are the same.

11. The method of claim 8, further comprising receiving, by the UE apparatus, a third beacon signal from a third beacon apparatus, wherein the third beacon signal includes a third service being advertised by the third beacon apparatus for a third service provider, and a third plurality of neighboring services provided by a third plurality of neighboring service providers proximately located from the third service provider; ordered in accordance with a third ranking criterion.

12. The method of claim 11, further comprising including, by the UE apparatus, with the selectable list of services the third service and the third plurality of neighboring services, further ordered in accordance with the third ranking criterion, and a third signal strength of the third beacon signal.

13. The method of claim 8, wherein the list of services for selecting comprises a list of uniform resource locators, URLs.

14. The method of claim 8, wherein a plurality of services in the list of services for selecting have the same URL with unique search strings appended to the URL.

15. The method of claim 8, further including receiving ranking criteria for the generated selectable list of services as input from a user of the UE apparatus, from storage on the UE apparatus, or from a computer server other than the UE apparatus.

16. The method of claim 8, wherein the first beacon signal includes a single URL.

17. The method of claim 8, wherein receiving a beacon signal further includes receiving the beacon signal using Bluetooth, Bluetooth low-energy, Wi-Fi, or cellular technology.

18. One or more computer-readable media comprising instructions that cause a computing device, in response to execution of the instructions by the computing device, to:
respectively receive, by a user equipment, UE, apparatus, a first beacon signal and a second beacon signal from a first beacon apparatus and a second beacon apparatus, the first beacon signal to include a first service advertised by the first beacon apparatus for a first service provider, and a first plurality of neighboring services provided by a first plurality of neighboring service providers proximately located from the first service provider, ordered in accordance with a first ranking criterion, and the second beacon signal including a second service advertised by the second beacon apparatus for a second service provider and a second plurality of neighboring services provided by a second plurality of service providers proximately located from the second service provider, ordered in accordance with a second ranking criterion;
generate and display, by the UE apparatus, a selectable list of services for discovering by a user of the UE apparatus, the selectable list of services including the first and second services, and the first and second plurality of neighboring services being ordered in accordance with the first and second ranking criterion, and respective first and second signal strengths of the first and second beacon signals.

19. The one or more computer-readable media of claim 18, wherein the first ranking criterion is based on distances between the respective locations of the first plurality of neighboring services providers and a location of the first service provider associated with the first beacon apparatus.

20. The one or more computer-readable media of claim 18, wherein the first and the second ranking criterion are the same.

21. The one or more computer readable media of claim 18, further comprising receive, by the UE apparatus, a third beacon signal from a third beacon apparatus, wherein the third beacon signal includes a third service advertised by the third beacon apparatus for a third service provider, and a third plurality of neighboring services provided by a third plurality of neighboring service providers proximately located from the third service provider; ordered in accordance with a third ranking criterion.

22. The one or more computer-readable media of claim 18, further comprising to receive one or more additional ranking criteria to generate the selectable list of services as input from a user of the UE apparatus, from storage on the UE apparatus, or from a computer server other than the UE apparatus.

23. The one or more computer-readable media of claim 18, wherein the first beacon signal comprises a single URL.

24. The one or more computer-readable media of claim 18 wherein to receive a beacon signal is to receive the beacon signal using Bluetooth, Bluetooth low-energy, Wi-Fi, or cellular technology.

* * * * *